US008584105B1

(12) United States Patent
Epshteyn et al.

(10) Patent No.: US 8,584,105 B1
(45) Date of Patent: Nov. 12, 2013

(54) JAVASCRIPT APPLICATION PROGRAMMING INTERFACES FOR INDEPENDENTLY COMPILED JAVASCRIPT BINARIES

(75) Inventors: Lev Epshteyn, Brooklyn, NY (US); Zachary Erik Lloyd, Brooklyn, NY (US); Haluk Burcin Tunali, North Bergen, NJ (US); Olga Sergeyevna Belomestnykh, New York, NY (US); Steven Saviano, Brooklyn, NY (US)

(73) Assignee: Google Inc., Mountain View, CA (US)

( * ) Notice: Subject to any disclaimer, the term of this patent is extended or adjusted under 35 U.S.C. 154(b) by 51 days.

(21) Appl. No.: 13/316,768

(22) Filed: Dec. 12, 2011

(51) Int. Cl.
*G06F 9/45* (2006.01)
*G06F 9/44* (2006.01)

(52) U.S. Cl.
USPC .......................... 717/140; 717/146; 719/328

(58) Field of Classification Search
USPC .......... 717/108, 114–116, 140–146, 151–156
See application file for complete search history.

(56) References Cited

U.S. PATENT DOCUMENTS

| 5,511,197 | A  | * | 4/1996  | Hill et al. ..................... 719/328 |
| 5,577,251 | A  | * | 11/1996 | Hamilton et al. ............. 718/101 |
| 5,737,607 | A  | * | 4/1998  | Hamilton et al. ............. 719/316 |
| 5,778,228 | A  | * | 7/1998  | Wei .............................. 719/328 |
| 5,887,172 | A  | * | 3/1999  | Vasudevan et al. ........... 719/328 |
| 5,926,636 | A  | * | 7/1999  | Lam et al. ..................... 719/313 |
| 6,298,391 | B1 | * | 10/2001 | Kennedy et al. .............. 719/328 |
| 6,834,391 | B2 | * | 12/2004 | Czajkowski et al. ......... 719/328 |
| 7,373,632 | B1 | * | 5/2008  | Kawaguchi et al. .......... 717/100 |
| 2002/0144018 | A1 | * | 10/2002 | Knutson et al. ................ 709/328 |
| 2007/0088831 | A1 |   | 4/2007  | Pallamreddy et al. |
| 2010/0122271 | A1 | * | 5/2010  | Labour et al. .................. 719/328 |
| 2010/0242017 | A1 | * | 9/2010  | Stenberg et al. .............. 717/111 |
| 2011/0016449 | A1 |   | 1/2011  | Yao et al. |

OTHER PUBLICATIONS

Paul Graham, "On Lisp—Nondeterminism", (Apr. 1, 2002, retrieved from <http://dunsmor.com/lisp/onlisp/onlisp.html#SEC_Top>, total pp. 17.*
Cutsem et al., "Proxies: Design Principles for Robust Object-oriented Intercession APIs", Copyright @ 2010 ACM 978-1-4503-0405-4, total pp. 14.*
Maffeis et al., "Isolating JavaScript with Filters, Rewriting, and Wrappers", Copyright @ Springer-Verlag Berlin Heidelberg 2009. total pp. 18.*

* cited by examiner

*Primary Examiner* — Don Wong
*Assistant Examiner* — Marina Lee
(74) *Attorney, Agent, or Firm* — Ropes & Gray LLP

(57) ABSTRACT

Systems, servers, methods, and media for interfacing first compiled code of first code with second compiled code of second code are provided. The first compiled code includes a first compiled object that corresponds to an original object in the first code, and includes a first API wrapper that associates the first compiled object with the original object. The second compiled code includes a second compiled object that corresponds to a reference in the second code to the original object, and includes a second API wrapper that associates the second compiled object with the reference. When the second compiled object in the second compiled code is executed, the second compiled code calls the second API wrapper, the second API wrapper proxies the call to the first API wrapper, and the first API wrapper proxies the call to the first compiled object in the first compiled code.

21 Claims, 4 Drawing Sheets

JAVASCRIPT APPLICATION PROGRAMMING INTERFACES FOR INDEPENDENTLY COMPILED JAVASCRIPT BINARIES

BACKGROUND

1. Field of the Disclosure

The present invention generally relates to the field of computer hardware and software implementation technologies, and, in particular, to interfacing between independently compiled JAVASCRIPT binary files.

JAVASCRIPT is a scripting language that is generally used for client-side web development. It is a dynamic, object-oriented, general-purpose programming language. A web browser is by far the most common host environment for JAVASCRIPT. In this regard, because JAVASCRIPT can run locally in a web browser rather than on a remote server, the web browser can respond to actions quickly, making an application more responsive.

By definition, a scripting language, such as JAVASCRIPT, is not compiled. Instead, scripts, and other dynamic programs, typically perform certain functions that are commonly performed during compilation at runtime. Recently, however, compilers have been developed for JAVASCRIPT. The compilers generally parse a JAVASCRIPT script, analyze the script, remove dead code, and rewrite and minimize the remaining code. The compilers may also check syntax, warn about common JAVASCRIPT scripting errors and potentially dangerous operations, and check object references and types. The compilers may also modify object names and other symbols for optimization and obfuscation purposes. The compile-time object name and symbol modification is typically non-deterministic, or unpredictable. Compilers for JAVASCRIPT generally enable scripts to download and execute even more quickly.

SUMMARY OF THE DISCLOSURE

The present disclosure, through one or more of its various aspects, embodiments, and/or specific features or sub-components, provides various systems, servers, methods, media, and programs for interfacing compiled codes, such as, for example, JAVASCRIPT scripts. According to the present disclosure, a first compiled code of a first code and a second compiled code of a second code each include an application programming interface (API) wrapper for proxying calls between the first and second compiled codes.

In this regard, even if an original object in the first code and a reference in the second code to the original object in the first code are non-deterministically or unpredictably renamed in the first and second compiled codes, the second compiled code is configured to call the compiled, or renamed, original object in the first compiled code. Thus, by providing an interface between the first and second compiled codes, the present disclosure provides the non-limiting benefits of compatibility between the compiled codes while also reducing code redundancy between the compiled codes, thereby further optimizing and improving the download and execution speeds of the compiled codes. Further benefits and advantages of the present disclosure are apparent from the various aspects and embodiments discussed in the Specification and shown in the Figures.

According to one non-limiting embodiment of the present disclosure, a server for interfacing a first compiled code of a first code with a second compiled code of a second code is provided. The server includes a processor and at least one memory that stores the first compiled code and the second compiled code. The first compiled code includes a first compiled object that corresponds to an original object in the first code, and includes a first API wrapper that associates the first compiled object with the original object. The second compiled code includes a second compiled object that corresponds to a reference in the second code to the original object, and includes a second API wrapper that associates the second compiled object with the reference. When the second compiled object in the second compiled code is executed, the second compiled code is configured to call the second API wrapper, the second API wrapper is configured to proxy the call to the first API wrapper, and the first API wrapper is configured to proxy the call to the first compiled object in the first compiled code.

According to one aspect of the present disclosure, the first code and the second code are written in a scripting language.

According to another aspect of the present disclosure, the first compiled code and the second compiled code are binary files.

According to yet another aspect of the present disclosure, the processor compiles the first code to produce the first compiled code, and compiles the second code to produce the second compiled code.

According to still another aspect of the present disclosure, the processor non-deterministically names the first compiled object when compiling the first code to produce the first compiled code, and non-deterministically names the second compiled object when compiling the second code to produce the second compiled code.

According to an additional aspect of the present disclosure, the processor independently compiles the first code and the second code to produce the first compiled code and the second compiled code.

According to another aspect of the present disclosure, the processor dynamically generates the first API wrapper when compiling the first code, and dynamically generates the second API wrapper when compiling the second code.

According to yet another aspect of the present disclosure, the original object and the reference to the original object are predetermined.

According to still another aspect of the present disclosure, the processor determines the original object when compiling the first code, and determines the reference to the original object when compiling the second code.

According to an additional aspect of the present disclosure, the second API wrapper is configured to predict symbols of the first API wrapper for proxying the call to the first API wrapper.

According to another non-limiting embodiment of the present disclosure, a computer-implemented method for interfacing between a first compiled code of a first code and a second compiled code of a second code is provided. The computer-implemented method includes generating, with at least one processor, a first API wrapper that associates a first compiled object in the first compiled code with an original object in the first code. The computer-implemented method also includes generating, with the at least one processor, a second API wrapper that associates a second compiled object in the second compiled code with a reference in the second code to the original object in the first code. When the second compiled object in the second compiled code is executed, the second compiled code is configured to call the second API wrapper, the second API wrapper is configured to proxy the call to the first API wrapper, and the first API wrapper is configured to proxy the call to the first compiled object in the first compiled code.

According to one aspect of the present disclosure, the first code and the second code are written in a scripting language.

According to another aspect of the present disclosure, the first compiled code and the second compiled code are binary files.

According to yet another aspect of the present disclosure, the computer-implemented method further includes compiling, with the at least one processor, the first code to produce the first compiled code, and compiling, with the at least one processor, the second code to produce the second compiled code.

According to still another aspect of the present disclosure, the at least one processor non-deterministically names the first compiled object when compiling the first code to produce the first compiled code, and non-deterministically names the second compiled object when compiling the second code to produce the second compiled code.

According to an additional aspect of the present disclosure, the at least one processor independently compiles the first code and the second code to produce the first compiled code and the second compiled code.

According to another aspect of the present disclosure, the computer-implemented method further includes predicting, with the at least one processor, symbols of the first API wrapper when generating the second API wrapper for configuring the second API wrapper to proxy the call to the first API wrapper.

According to a further non-limiting embodiment of the present disclosure, a non-transitory computer-readable medium including an executable first compiled code of a first code for interfacing with a second compiled code of a second code is provided. The executable first compiled code includes a compiled object that corresponds to an original object in the first code, and a first API wrapper that associates the compiled object with the original object. In this regard, the first API wrapper is configured to receive a call from a second API wrapper of the second compiled code, and to proxy the call to the compiled object in the first compiled code.

According to one aspect of the present disclosure, the first code is written in a scripting language.

According to another aspect of the present disclosure, the first compiled code is a binary file.

According to yet another aspect of the present disclosure, the compiled object of the original object is non-deterministically named.

According to an even further non-limiting embodiment of the present disclosure, a non-transitory computer-readable medium including an executable second compiled code of a second code for interfacing with a first compiled code of a first code is provided. The executable second compiled code includes a second compiled object that corresponds to a reference in the second code to an original object in the first code, and a second API wrapper that associates the second compiled object with the reference. In this regard, when the second compiled object in the second compiled code is executed, the second compiled code is configured to call the second API wrapper, and the second API wrapper is configured to proxy the call to a first API wrapper of the first compiled code for proxying the call from the first API wrapper to a first compiled object in the first compiled code that corresponds to the original object in the first code.

According to one aspect of the present disclosure, the second code is written in a scripting language.

According to another aspect of the present disclosure, the second compiled code is a binary file.

According to yet another aspect of the present disclosure, the second compiled object that corresponds to the reference in the second code to the original object is non-deterministically named.

According to still another aspect of the present disclosure, the second API wrapper is configured to predict symbols of the first API wrapper for configuring the second API wrapper to call the first API wrapper.

BRIEF DESCRIPTION OF THE DRAWINGS

The present invention is further described in the detailed description which follows, in reference to the noted plurality of drawings, by way of non-limiting examples of preferred embodiments of the present invention, in which like characters represent like elements throughout the several views of the drawings.

DETAILED DESCRIPTION

The present disclosure, through one or more of its various aspects, embodiments and/or specific features or sub-components, is thus intended to bring out one or more of the advantages as specifically noted below.

Figure 1:
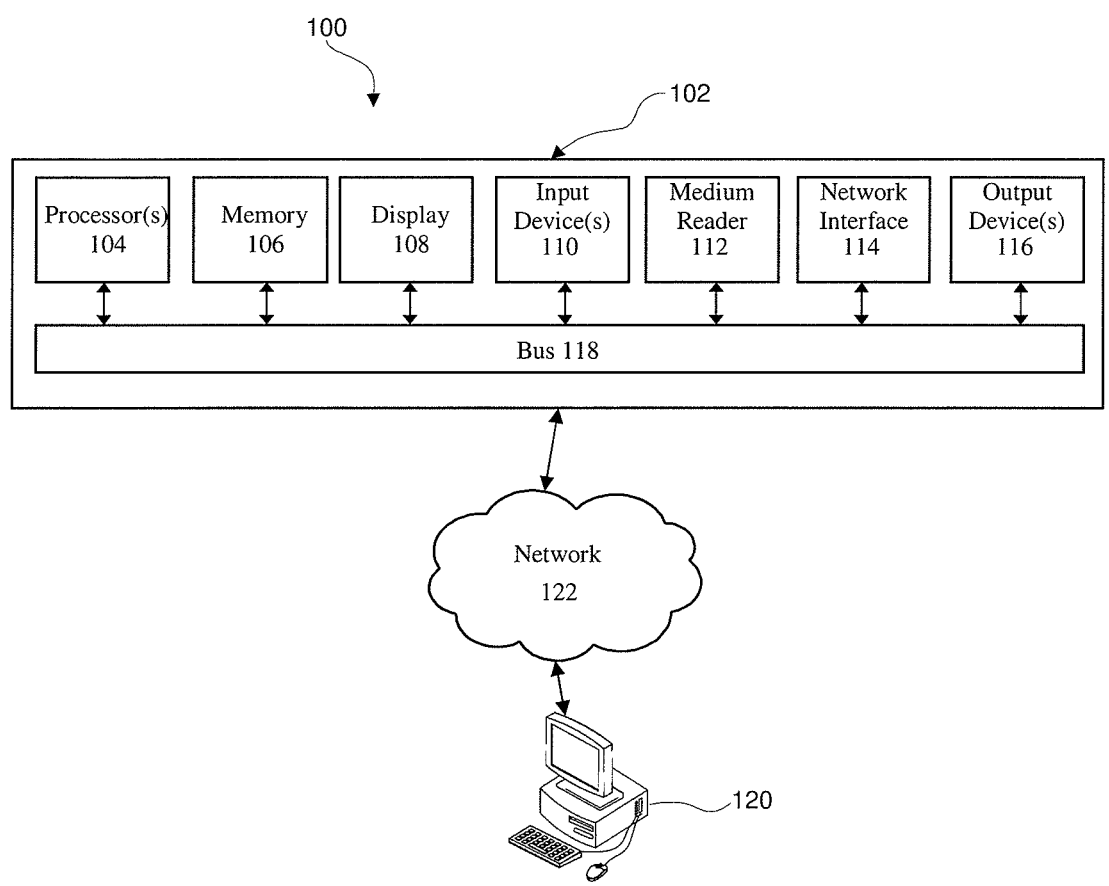
FIG. 1 is a schematic of an exemplary system for interfacing a first compiled code of a first code with a second compiled code of a second code, according to an embodiment of the present disclosure.

FIG. 1 is an illustrative embodiment of a system 100 for interfacing a first compiled code of a first code with a second compiled code of a second code. The system 100 is generally shown and may include a computer system 102, which is generally indicated. The computer system 102 may operate as a standalone device or may be connected to other systems or peripheral devices. For example, the computer system 102 may include, or be included within, any one or more computers, servers, systems, or communication networks.

The computer system 102 may operate in the capacity of a server or as a client user computer in a server-client user network environment. The computer system 102, or portions thereof, can also be implemented as, or incorporated into, various devices, such as a personal computer (PC), a tablet PC, a set-top box (STB), a personal digital assistant (PDA), a mobile device, a palmtop computer, a laptop computer, a desktop computer, a communications device, a wireless telephone, a personal trusted device, a web appliance, or any other machine capable of executing a set of instructions (sequential or otherwise) that specify actions to be taken by that machine. Further, while a single computer system 102 is illustrated, the term "system" shall also be taken to include any collection of systems or sub-systems that individually or jointly execute a set, or multiple sets, of instructions to perform one or more functions.

As illustrated in FIG. 1, the computer system 102 may include at least one processor 104, such as, for example, a central processing unit (CPU), a graphics processing unit (GPU), or both. The computer system 102 may also include a computer memory 106. The computer memory 106 may include a static memory and/or a dynamic memory. The memory may further include a hard disk, random access memory, and/or a cache. Of course, those skilled in the art appreciate that the computer memory 106 may comprise any combination of known memories or a single storage.

As shown in FIG. 1, the computer system 102 may include a computer display 108, such as a liquid crystal display (LCD), an organic light emitting diode (OLED), a flat panel display, a solid state display, a cathode ray tube (CRT), or any other known display.

Additionally, the computer system 102 may include at least one computer input device 110, such as a keyboard, a remote control device having a wireless keypad, a microphone coupled to a speech recognition engine, a camera such as a video camera or still camera, a cursor control device, or any combination thereof. Those skilled in the art appreciate that various embodiments of the computer system 102 may include multiple input devices. Moreover, those skilled in the art further appreciate that the above-listed input devices are merely meant to be exemplary and that the computer system 102 may include any additional, or alternative, input devices.

The computer system 102 may also include a disk drive 112 and a network interface 114. Furthermore, the computer system 102 may include any additional devices which are commonly known and understood as being within a computer system, such as, but not limited to, an output device 116. The output device 116 may be, but is not limited to, a speaker, an audio out, a video out, a remote control output, or any combination thereof.

Each of the components of the computer system 102 may be interconnected and communicate via a bus 118. As shown in FIG. 1, the components may each be interconnected and communicate via an internal bus. However, those skilled in the art appreciate that any of the components may also be connected via an expansion bus. Moreover, the bus 118 may enable communication via any standard or other specification commonly known and understood such as, but not limited to, peripheral component interconnect (PCI), peripheral component interconnect express (PCIe), parallel advanced technology attachment (PATA), serial advanced technology attachment (SATA), etc.

The computer system 102 may be in communication with one or more additional computer devices 120 via a network 122. The network 122 may be, but is not limited to, a local area network, a wide area network, the Internet, a telephony network, or any other network commonly known and understood in the art. The network 122 is shown in FIG. 1 as a wireless network. However, those skilled in the art appreciate that the network 122 may also be a wired network.

The additional computer device 120 is shown in FIG. 1 as a personal computer (PC). However, those skilled in the art appreciate that, in alternative embodiments of the present application, the device 120 may be a laptop computer, a tablet PC, a personal digital assistant (PDA), a mobile device, a palmtop computer, a desktop computer, a communications device, a wireless telephone, a personal trusted device, a web appliance, or any other device that is capable of executing a set of instructions, sequential or otherwise, that specify actions to be taken by that device. Of course, those skilled in the art appreciate that the above-listed devices are merely exemplary devices and that the device 120 may be any additional device or apparatus commonly known and understood in the art without departing from the scope of the present application. Furthermore, those skilled in the art similarly understand that the device may be any combination of devices and apparatuses.

Of course, those skilled in the art appreciate that the above-listed components of the computer system 102 are merely meant to be exemplary and are not intended to be exhaustive and/or inclusive. Furthermore, the examples of the components listed above are also meant to be exemplary and similarly are not meant to be exhaustive and/or inclusive.

Figure 2:
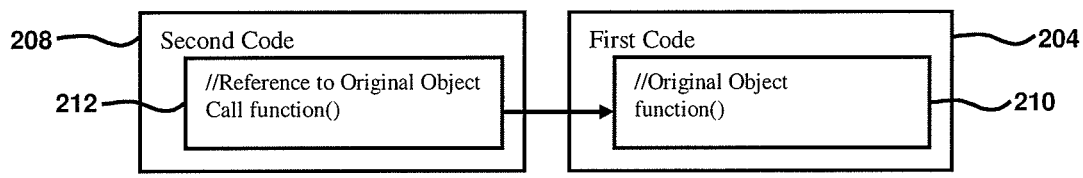
FIG. 2 is a schematic of a call from a reference in a second code to an original object in a first code.
Figure 3:
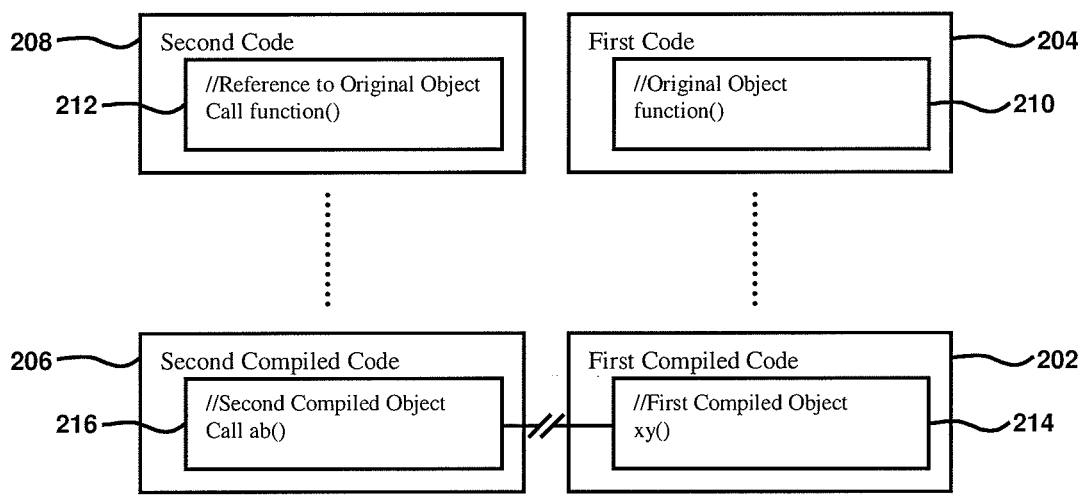
FIG. 3 is a schematic of a failed call from a second compiled code of a second code to a first compiled code of a first code.
Figure 4:
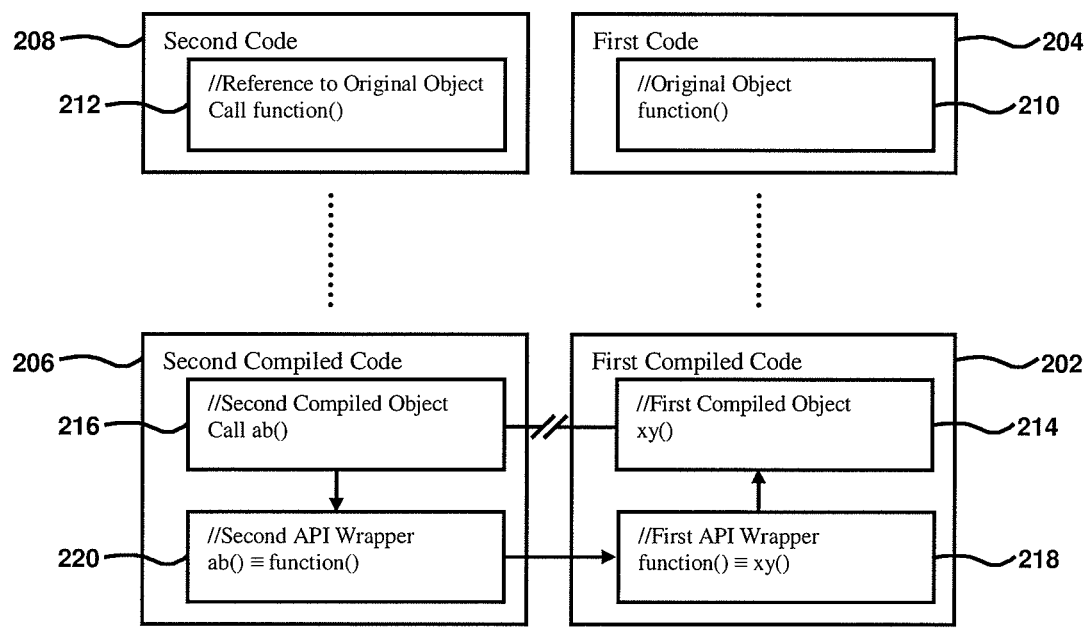
FIG. 4 is a schematic of another call from a second compiled code of a second code to a first compiled code of a first code.

According to an embodiment of the present application, as shown in FIGS. 2-4, the computer system 102 provides for interfacing a first compiled code 202 of a first code 204 with a second compiled code 206 of a second code 208.

The first code 204 and the second code 208 as shown in FIGS. 2-4 may be a first JAVASCRIPT script and a second JAVASCRIPT script. Those skilled in the art, however, appreciate that the first code 204 and the second code 208 are not limited to being JAVASCRIPT scripts, or even scripts. That is, those skilled in the art appreciate that the first code 204 and the second code 208 may be written in any scripting language or any other programming language without departing from the scope of the present application. For example, the first code 204 and the second code 208 may be written in, but are not limited to, VBScript, XUL, and XSLT and may comprise, but are not limited to, programs, applications, or any other known code bundles.

The first code 204 includes an original object 210. The original object 210 is any object that is constructed within the first code 204. The original object 210 may be, for example, a value, a variable, a function, a method, or any other data structure. In this regard, in FIGS. 2-4, the original object 210 is shown as being named "function( )". Of course, those skilled in the art appreciate that the above list and FIGS. 2-4 are merely exemplary and are not to be limiting in any way.

The second code 208 includes a reference 212 to the original object 210 in the first code 204. For example, as shown in FIGS. 2-4, the reference 212 may be a call to the original object 210. In this regard, it is often desirable to enable a first code set to interact with a second code set. Such interaction improves functionality while also minimizing redundant code. As shown in FIG. 2, when the reference 212 in the second code 208 to the original object 210 in the first code 204 is executed, the second code 208 is able to interface with the first code 204.

In an embodiment of the present application, the processor 104 of the computer system 102 compiles the first code 204 to produce the first compiled code 202 and compiles the second code 208 to produce the second compiled code 206. The processor 104 may compile the first code 204 and the second code 208 in accordance with any known compilation methods, procedures, or operations. The processor 104 may compile the first code 204 and the second code 208 to optimize and minimize the first compiled code 202 and the second compiled code 206 by removing dead code and rewriting the remaining code. The processor 104 may also check for syntax and other coding errors by analyzing the first code 204 and the second code 208. In even further embodiments, the processor 104 may check for potentially dangerous operations in the first code 204 and the second code 208. Additionally, or alternatively, to the above, the processor 104 may optimize and/or obfuscate the first compiled code 202 and the second compiled code 206 by modifying a name of the original object 210, a name of the reference 212 to the original object 210, additional object names, additional reference names, and/or additional symbols. Those skilled in the art appreciate that the processor 104 may perform any additional operations in addition to, or in combination with, any of the above listed operations without departing from the scope of the invention.

The first compiled code 202 and the second compiled code 206 may be stored in the memory 106 of the computer system 102. In embodiments of the present application, the fast compiled code 202 and the second compiled code 206 may be binaries. Furthermore, in the embodiments of the present application in which the first code 204 and the second code 208 comprise JAVASCRIPT, the compiled code 202 and the second compiled code 206 may be JAVASCRIPT binaries. Those skilled in the art, of course, understand that the above examples are merely exemplary and are not meant to be limiting. In additional embodiments, the first compiled code 202 and the second compiled code 206 may be, but are not limited to, assembly language or machine code.

The first code 204 and the second code 208 may be independently compiled by the processor 104. That is, the first code 204 and the second code 208 may be compiled at different times and/or by different processors. Moreover, the first code 204 and the second code 208 may be compiled by the processor 104 of the computer system 102 before being transmitted over the network 122. In additional, or alternative, embodiments of the present application, the first code 204 and the second code 208 may be transmitted over the network 122 before being compiled, and may be compiled by the additional computer device 120.

The first compiled code 202 includes a first compiled object 214 that corresponds to the original object 210 in the first code 204. Furthermore, the second compiled code 206 includes a second compiled object 216 that corresponds to the reference 212 in the second code 208 to the original object 210 in the first code 204.

In embodiments of the present application in which the processor 104 modifies the name of the original object 210, the name of the reference 212 to the original object 210, the additional object names, and/or the additional symbols, the processor 104 may non-deterministically, or unpredictably, modify the names and/or symbols. According to such embodiments, the processor 104 non-deterministically, or unpredictably, names the first compiled object 214 when compiling the first code 204 to produce the first compiled code 202, and non-deterministically, or unpredictably, names the second compiled object 216 when compiling the second code 208 to produce the second compiled code 206. For example, in the exemplary embodiments of FIGS. 2-4, the first compiled object 214, which corresponds to the original object 210 shown as "function( )", is non-deterministically, or unpredictably, named "xy( )", while the second compiled object 216, which corresponds to the reference 212 to the original object 210 shown as "Call function( ), is non-deterministically, or unpredictably, named" Call ab( ). Of course, those skilled in the art appreciate that the above-described examples and FIGS. 2-4 are merely meant to be exemplary and are not intended to be limiting in any way.

In the above-described embodiments in which the processor 104 non-deterministically names the first compiled object 214, which corresponds to the original object 210, and the second compiled object 216, which corresponds to the reference 212 to the original object 210, the interface between the second compiled code 206 and the first compiled code 202 fails. That is, since the second code 208 is unable to determine, or predict, what the first compiled object 214 is non-deterministically named, the interface between the second compiled object 216 and the first compiled object 214 fails.

For example, as shown in FIG. 3, the second compiled code 206 may attempt to call "ab( )", but the first compiled object 214 in the first compiled code 202 is non-deterministically named "xy( )". Thus, directly referencing objects between the first complied code 202 and the second compiled code 206 is difficult. In this regard, it is often desirable to enable the first complied code 202 to interact with the second compiled code 206, and vice versa. For example, in embodiments of the present application in which the first compiled code 202 and the second compiled code 206 are JAVASCRIPT binaries, it may be desirable to have a compiled application embedded in a browser iFrame interacting with a compiled container application that embeds it.

As a result, the first compiled code 202 may include a first API wrapper 218 that associates the first compiled object 214 in the first compiled code 202 with the original object 210 in the first code 204. The first API wrapper 218 may include a set of modules, protocols, symbols, tools, or any combination thereof for allowing objects instantiated in the second compiled code 206, or any other environment, to execute and/or access objects, including the first compiled object 214, in the first compiled code 202. As such, the first API wrapper 218 may function as an interface that passes data regarding the correspondence between the first compiled object 214 and the original object 210 to the second compiled code 206.

The second compiled code 206 includes a second API wrapper 220 that associates the second compiled object 216 with the reference 212 in the second code 208 to the original object 210 in the first code 204. The second API wrapper 220 also includes a set of modules, protocols, symbols, tools, or any combination thereof for allowing objects instantiated in the second compiled code 206 to execute and/or access objects, including the first compiled object 214, in the first compiled code 202, or any other environment. As such, the second API wrapper 220 may function as an interface that passes data regarding the correspondence between the reference 212 and the second compiled object 216 to the first compiled code 202.

In embodiments of the present application, the modules, protocols, symbols, tools, and combinations thereof of the first API wrapper 218 of the first compiled code 202 are predetermined or predictable by the second API wrapper 220. Thus, the second API wrapper 220 of the second compiled code 206 may determine or predict such modules, protocols, symbols, tools, and combinations thereof independently of the first API wrapper 218. In other words, the first API wrapper 218 is able to export its API be making its modules, protocols, symbols, tools, and combinations thereof predictable or determinable so that the second API wrapper 220 may consume the first API wrapper 218. As long as code written to generate the second API wrapper 220 only uses the predictable or determinable interface of the first API wrapper 218, the second API wrapper 220 does not need to make special allowances to accommodate objects that actually reside in the first code 204 and/or first compiled code 202 since any translations will seamlessly take place in the first API wrapper 218 that exports its API and the second API wrapper 220 that consumes the API of the first API wrapper 218.

Since the modules, protocols, symbols, tools, and combinations thereof of the first API wrapper 218 are predictable or determinable, the second API wrapper 220 may be generated independently of the first API wrapper 218. The first API wrapper 218 and the second API wrapper 220 may be dynamically generated by the processor 104 during compilation of the first code 204 and the second code 208. Alternatively, the first API wrapper 218 and the second API wrapper 220 may be generated at run-time.

Additionally, since the modules, protocols, symbols, tools, and combinations thereof of the first API wrapper 218 are predictable or determinable, either of the first code 204 or the second code 208 may be changed, modified, or altered without destroying the interface between the first API wrapper 218 and the second API wrapper 220, provided that the first code 204 and the second code 208 are re-compiled and the first API wrapper 218 and the second API wrapper 220 are re-generated.

According to an embodiment of the present application, when associating the first compiled object 214 in the first compiled code 202 with the original object 210 in the first code 204, the original object 210 may be predetermined. That is, the original object 210 may be included in the set of modules, protocols, symbols, tools, or combination thereof included for the first API wrapper 218. As such, the first API wrapper 218 may associate the first compiled object 214, which may be non-deterministically named, with the original object 210. Of course, those skilled in the art appreciate that the reference 212 included in the second code 208 to the original object 210 may also be predetermined.

In an alternative embodiment, the original object 210 may not be predetermined. That is, the set of modules, protocols, symbols, tools, or combination thereof included for the first API wrapper 218 may not include the original object 210. In this regard, the original object 210 may be determined when compiling the first code 204. The processor 104 may automatically determine the original object 210 when compiling the first code 204. For example, the processor 104 may automatically determine the original object 210 as being any object included in the first code 204. Alternatively, the processor 104 may automatically determine the original object 210 as being any object included in the first code 204 that satisfies a predetermined condition. The predetermined condition may be, but is not limited to, the object being of a predetermined type or the object being located within the first code 204 at, or near, a predetermined position or data structure. Of course, those skilled in the art appreciate that the reference 212 included in the second code 208 to the original object 210 included in the first code 204 may be determined in a similar manner.

In accordance with the above and as shown in FIG. 4, when the second compiled object 216 in the second compiled code 206 is executed, the second compiled code 206 calls the second API wrapper 220, which associates the second compiled object 216, shown as "ab( )", with the reference 212 to the original object 210, shown as "function( )". In response, the second API wrapper 220 proxies the call to the first API wrapper 218 of the first compiled code 202, which associates the original object 210, shown as "function( )", with the first compiled object 214, shown as "xy( )". Then, the first API wrapper 218 proxies the call to the first compiled object 214, shown as "xy( )", in the first compiled code 202.

Thus, in view of the above, the original object 210, the reference 212 to the original object 210, the first API wrapper 218, and the second API wrapper 220 implement a single interface.

Figure 5:
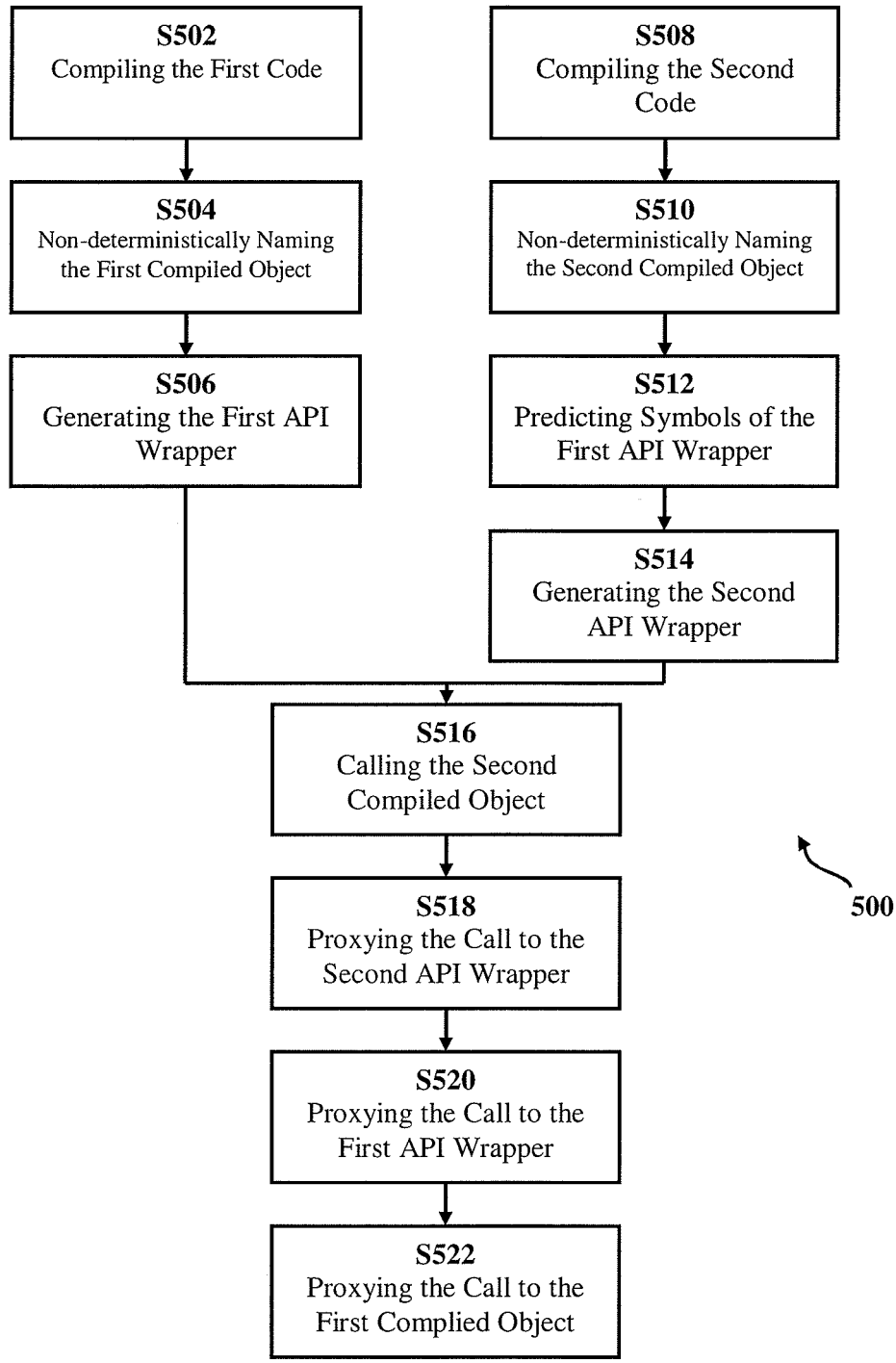
FIG. 5 is a flow chart of an exemplary method for interfacing a first compiled code of a first code with a second compiled code of a second code, according to an embodiment of the present disclosure.

FIG. 5 shows a further embodiment of the present application. A method for interfacing a first compiled code with a second compiled code is generally shown at 500. At S502, a first code is compiled to produce the first compiled code. An original object in the first code is non-deterministically renamed when compiling the first code to produce a first compiled object at S504. A first API wrapper of the first compiled code that associates the original object with the first compiled object is generated at S506.

The method further includes compiling a second code to produce the second compiled code at S508. A reference in the second code to the original object in the first code is non-deterministically renamed when compiling the second code to produce a second compiled object at S510. Symbols of the first API wrapper are predicted at S512 to enable the second API wrapper to interface with the first API wrapper. A second API wrapper of the second compiled code that associates the second compiled object with the reference to the original object is generated at S514.

When the second compiled object in the second compiled code is called at S516, the second compiled code proxies the call to the second API wrapper of the second compiled code at S518. In response, the second API wrapper, which has consumed the API of the first API wrapper, proxies the call to the first API wrapper at S520 based on the association between the second compiled object and the reference to the original object. Then, the first API wrapper proxies the call to the first compiled object at S522 based on the association between the original object and the first compiled object.

Even further embodiments of the present application provide various non-transitory computer-readable media for interfacing the first compiled code with the second compiled code. The various non-transitory computer-readable media may comprise the memory 106 of the computer system 102, be readable by the medium reader 112 of the computer system 102, or be readable by the additional computer device 120. in this regard, the non-transitory computer-readable media may comprise any media known and understood in the art.

According to a first embodiment, the non-transitory computer-readable medium includes an executable first compiled code for interfacing with the second compiled code. The executable first compiled code includes the first compiled object and the first API wrapper. The first API wrapper is configured to receive a call from a API wrapper of the second compiled code, and to proxy the call to the compiled object in the first compiled code.

According to another embodiment, the non-transitory computer-readable medium includes an executable second compiled code for interfacing with the first compiled code. The executable second compiled code includes the second compiled object and the second API wrapper. When the second compiled object in the second compiled code is executed, the second compiled code is configured to call the second API wrapper, and the second API wrapper is configured to proxy the call to a first API wrapper of the first compiled code for proxying the call from the first API wrapper to a first compiled object in the first compiled code that corresponds to the original object in the first code.

Those skilled in the art, of course, appreciate that the various features and embodiments of the above-described system may be incorporated into the above-described method and media without departing from the scope of the application. Moreover, those skilled in the art appreciate that the various features and embodiments of the above-described system may be implemented as a program or code segment which are executable for causing a server, computer, or system to operate in accordance with the above-described system.

Accordingly, the present invention provides various systems, servers, methods, media, and programs for interfacing a first compiled code 202 with a second compiled code 206, even when objects and references to the objects in a first code 204 and a second code 208 are non-deterministically renamed when compiling the first code 204 and the second code 208 to produce the first compiled code 202 and the second compiled code 206, respectively.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the invention in its aspects. Although the invention has been described with reference to particular means, materials and embodiments, the invention is not intended to be limited to the particulars disclosed; rather the invention extends to all functionally equivalent structures, methods, and uses such as are within the scope of the appended claims.

For example, the present application describes the first code 204 and the second code 208 as being JAVASCRIPT, and describes the first compiled code 202 and the second compiled code 206 as being JAVASCRIPT binaries. In this regard, it is to be understood that the first code 204 and the second code 208 are not limited solely to being JAVASCRIPT and the first compiled code 202 and the second compiled code 206 are not limited solely to being JAVASCRIPT binaries. For example, the first code 204 and the second code 208 may comprise any scripting language or other programming language. Moreover, the first compiled code 202 and the second compiled code 206 may comprise assembly language or machine code.

While the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as code segments in computer-readable media, it is to be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. §1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A system for interfacing a first compiled code of a first code with a second compiled code of a second code, comprising:
 a processor; and
 at least one memory that stores the first compiled code and the second compiled code, wherein the first compiled code includes a first compiled object that corresponds to an original object in the first code, and includes a first application programming interface wrapper that associates the first compiled object with the original object, the first compiled object being assigned a first non-deterministic name when the processor compiles the first code to produce the first compiled code, the second compiled code includes a second compiled object that corresponds to a reference in the second code to the original object, and includes a second application programming interface wrapper that associates the second compiled object with the reference, and when the second compiled object in the second compiled code is executed, the second compiled code is configured to call the second application programming interface wrapper, the second application programming interface wrapper is configured to proxy the call to the first application programming interface wrapper via the reference, and the first application programming interface wrapper is configured to use the first non-deterministic name to proxy the call to the first compiled object in the first compiled code.

2. The system according to claim 1, wherein the first code and the second code are written in a scripting language.

3. The system according to claim 2, wherein the first compiled code and the second compiled code are binary files.

4. The system according to claim 2, wherein the processor compiles the first code to produce the first compiled code, and compiles the second code to produce the second compiled code.

5. The system according to claim 4, wherein the processor independently compiles the first code and the second code to produce the first compiled code and the second compiled code.

6. The system according to claim 4, wherein the processor dynamically generates the first application programming interface wrapper when compiling the first code, and dynamically generates the second application programming interface wrapper when compiling the second code.

7. The system according to claim 4, wherein the original object and the reference to the original object are predetermined.

8. The system according to claim 4, wherein the processor determines the original object when compiling the first code, and determines the reference to the original object when compiling the second code.

9. The system according to claim 1, wherein the second application programming interface wrapper is configured to predict symbols of the first application programming interface wrapper for proxying the call to the first application programming interface wrapper.

10. The system according to claim 1, wherein a second non-deterministic name is assigned to the second compiled object when the processor compiles the second code to produce the second compiled code, and the second application programming interface wrapper is configured to use the second non-deterministic name to proxy the call to the first application programming interface wrapper.

11. A computer-implemented method for interfacing between a first compiled code of a first code and a second compiled code of a second code, comprising:

generating, with at least one processor, a first application programming interface wrapper that associates a first compiled object in the first compiled code with an original object in the first code, the first compiled object being assigned a first non-deterministic name the first code is compiled to produce the first compiled code; and generating, with the at least one processor, a second application programming interface wrapper that associates a second compiled object in the second compiled code with a reference in the second code to the original object in the first code, wherein, when the second compiled object in the second compiled code is executed, the second compiled code is configured to call the second application programming interface wrapper, the second application programming interface wrapper is configured to proxy the call to the first application programming interface wrapper via the reference, and the first application programming interface wrapper is configured to use the first non-deterministic name to proxy the call to the first compiled object in the first compiled code.

12. The computer-implemented method according to claim 11, wherein the first code and the second code are written in a scripting language.

13. The computer-implemented method according to claim 12, wherein the first compiled code and the second compiled code are binary files.

14. The computer-implemented method according to claim 12, further comprising:

compiling, with the at least one processor, the first code to produce the first compiled code; and compiling, with the at least one processor, the second code to produce the second compiled code.

15. The computer-implemented method according to claim 14, wherein the at least one processor independently compiles the first code and the second code to produce the first compiled code and the second compiled code.

16. The computer-implemented method according to claim 11, further comprising:

predicting, with the at least one processor, symbols of the first application programming interface wrapper when generating the second application programming interface wrapper for configuring the second application programming interface wrapper to proxy the call to the first application programming interface wrapper.

17. The computer-implemented method of claim 11, wherein a second non-deterministic name is assigned to the second compiled object when the second code is compiled to produce the second compiled code, and the second application programming interface wrapper is configured to use the second non-deterministic name to proxy the call to the first application programming interface wrapper.

18. A non-transitory computer-readable medium including an executable second compiled code of a second code for interfacing with a first compiled code of a first code, the executable second compiled code comprising:

a second compiled object that corresponds to a reference in the second code to an original object in the first code; and a second application programming interface wrapper that associates the second compiled object with the reference wherein, a non-deterministic name is assigned to the second compiled object when the second code is compiled to produce the second compiled code, and when the second compiled object in the second compiled code is executed, the second compiled code is configured to call the second application programming interface wrapper, and the second application programming interface wrapper is configured to use the non-deterministic name to proxy the call to a first application programming interface wrapper of the first compiled code for proxying the call from the first application programming interface wrapper via the reference to a first compiled object in the first compiled code that corresponds to the original object in the first code.

19. The non-transitory computer-readable medium according to claim 18, wherein the second code is written in a scripting language.

20. The non-transitory computer-readable medium according to claim 19, wherein the second compiled code is a binary file.

21. The non-transitory computer-readable medium according to claim 18, wherein the second application programming interface wrapper is configured to predict symbols of the first application programming interface wrapper for configuring the second application programming interface wrapper to call the first application programming interface wrapper.

* * * * *